United States Patent
Lafford et al.

(10) Patent No.: US 11,599,473 B1
(45) Date of Patent: Mar. 7, 2023

(54) METHODS AND APPARATUS FOR TRAINING PREFETCH INFORMATION

(71) Applicant: Arm Limited, Cambridge (GB)

(72) Inventors: Devin S Lafford, Austin, TX (US); Alexander Cole Shulyak, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/505,957

(22) Filed: Oct. 20, 2021

(51) Int. Cl.
*G06F 12/0862* (2016.01)
*G06F 12/02* (2006.01)
*G06F 12/0871* (2016.01)
*G06F 12/0891* (2016.01)

(52) U.S. Cl.
CPC ...... *G06F 12/0862* (2013.01); *G06F 12/0238* (2013.01); *G06F 12/0871* (2013.01); *G06F 12/0891* (2013.01)

(58) Field of Classification Search
CPC ............. G06F 12/0238; G06F 12/0862; G06F 12/0871; G06F 12/0891
See application file for complete search history.

(56) References Cited

U.S. PATENT DOCUMENTS

| 10,346,360 | B1* | 7/2019 | Basov ................ G06F 12/0862 |
| 2018/0089085 | A1* | 3/2018 | Kothinti Naresh ........................ G06F 12/0862 |

OTHER PUBLICATIONS

Stephen Somogyi, et al., "Spatial Memory Streaming", In Proceedings of the 33$^{rd}$ Annual International Symposium on Computer Architecture, Jun. 2006, 12 pages.

* cited by examiner

*Primary Examiner* — Aracelis Ruiz
(74) *Attorney, Agent, or Firm* — Nixon & Vanderhye P.C.

(57) ABSTRACT

Aspects of the present disclosure relate to an apparatus comprising prefetch information storage circuitry and prefetch training circuitry. The prefetch training circuitry comprises a plurality of entries, and is configured to: allocate a given entry to a given data address region; receive access information indicative of data accesses within the given data address region; based on said access information, train prefetch information associated with the given data address region, the prefetch information being indicative of a pattern of said data accesses within the given data address region; and responsive to an eviction condition being met after an elapsed period, since said allocation of the given entry, has exceeded a threshold, perform an eviction comprising transferring the prefetch information associated with the given data address region to the prefetch information storage circuitry.

20 Claims, 5 Drawing Sheets

METHODS AND APPARATUS FOR TRAINING PREFETCH INFORMATION

BACKGROUND

The present technique relates to the field of prefetching. Prefetching is the process of fetching information (for example data, or processing instructions) into a storage such as a cache, before that information is requested or required for processing operations. This can improve the throughput of processing operations, by reducing or removing the bottleneck associated with retrieving such information. For example, when data is requested (for example by a fetch unit of a processing pipeline), retrieving that data from memory can be relatively time-consuming. However, if that data has been prefetched into a rapidly-accessible storage such as a cache, the time to retrieve the data is reduced.

Because prefetching occurs prior to the information actually being requested or required for processing, it is based on predictions of what information (such as data or instructions) will be required for processing operations in the future. The effectiveness of prefetching thus depends on the accuracy of this prediction: an inaccurate prefetcher, which prefetches information that will not be required for processing, would consume resources without improving processing performance.

There is therefore a desire for improved prefetcher prediction performance.

SUMMARY

At least some examples provide an apparatus comprising:
prefetch information storage circuitry to store prefetch information associated with respective data address regions, the prefetch information in respect of a given data address region identifying expected access patterns associated with the given data address region;
prefetch training circuitry, comprising a plurality of entries, to:
  allocate a given entry to a given data address region;
  receive access information indicative of data accesses within the given data address region;
  based on said access information, train prefetch information associated with the given data address region, the prefetch information being indicative of a pattern of said data accesses within the given data address region; and
  responsive to an eviction condition being met after an elapsed period, since said allocation of the given entry, has exceeded a threshold, perform an eviction comprising transferring the prefetch information associated with the given data address region to the prefetch information storage circuitry.

Further examples provide a system comprising:
an apparatus as set out above; and
processing circuitry configured to access data and, based on said data access, provide said access information to the prefetch training circuitry.

Further examples provide a method comprising:
storing prefetch information associated with respective data address regions, the prefetch information in respect of a given data address region identifying expected access patterns associated with the given data address region;
allocating a given entry to a given data address region;
receiving access information indicative of data accesses within the given data address region;
based on said access information, training prefetch information associated with the given data address region, the prefetch information being indicative of a pattern of said data accesses within the given data address region; and
responsive to an eviction condition being met after an elapsed period, since said allocation of the given entry, has exceeded a threshold, performing an eviction comprising transferring the prefetch information associated with the given data address region to the prefetch information storage.

Further aspects, features and advantages of the present technique will be apparent from the following description of examples, which is to be read in conjunction with the accompanying drawings.

DESCRIPTION OF EXAMPLES

Figure 1:
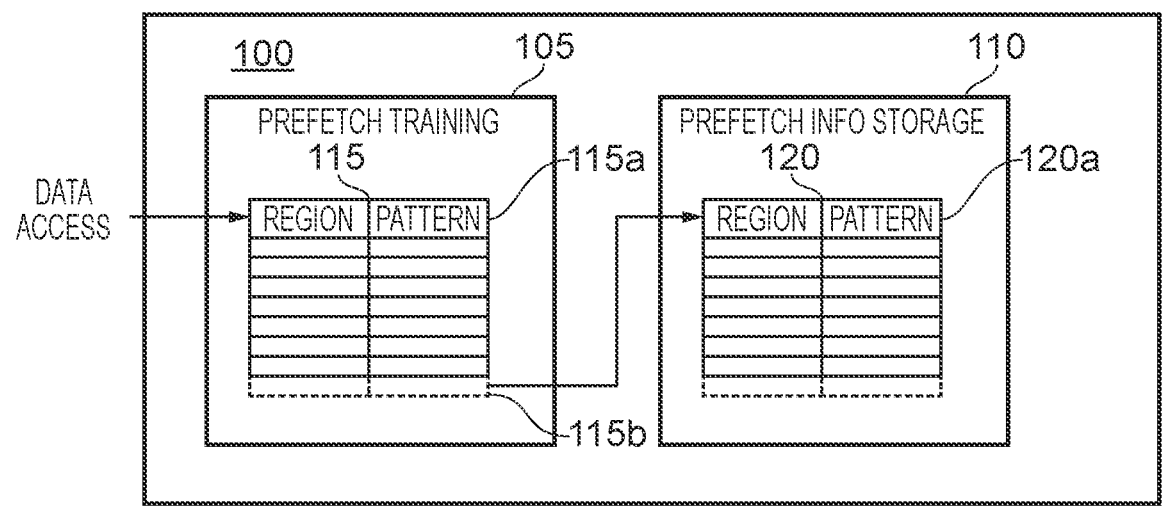
FIG. 1 schematically depicts an apparatus according to an example.

An example apparatus comprises prefetch information storage circuitry and prefetch training circuitry. The apparatus may form part of dedicated prefetch circuitry, for example forming part of processing circuitry. Alternatively, one or both of the aforementioned "circuitry" units may be implemented as a routine performed by more general-purpose processing circuitry.

The prefetch information storage circuitry is configured to store prefetch information associated with respective data regions (which may for example be regions of storage, for example identified as ranges of memory addresses). The prefetch information in respect of a given data region identifies expected access patterns associated with the given data region. For example, the expected access pattern associated with one region may be a spatial pattern such as a "stride" pattern" by which regularly-spaced memory addresses are accessed in sequence. A different region may have a different expected access pattern. Based on these expected access patterns, current and/or recent data accesses can be extrapolated into the future to predict and prefetch data which is expected to be required for future processing operations.

The aforementioned prefetch information is determined, for given data regions, by the prefetch training circuitry, in the following manner.

The prefetch training circuitry comprises a plurality of entries. A given entry is allocated to a given data region. For example, each entry may correspond to a range of memory addresses. An entry may for example be allocated to a given data region in response to processing circuitry accessing data, within a region which does not currently have an allocated entry. The plurality of entries may thus represent a subset of the data regions, for example a subset within which data has recently been accessed.

The prefetch training circuitry receives access information indicative of data accesses within the given data region. For example, the access information may be received from processing circuitry which accesses data and feeds back access information accordingly.

Based on the access information, the prefetch training circuitry trains prefetch information associated with the given data region. The prefetch information is indicative of a pattern of data accesses within the given data region. In this manner, increasingly accurate prefetch information can be determined in respect of each data region that has a corresponding entry in the prefetch training circuitry. The pattern of data accesses may be a spatial pattern of data accesses, for example a repeating pattern of spaces between accessed memory addresses. One example of such pattern, as noted above, is a stride pattern. On the assumption that the observed access pattern is repeated into the future, the trained prefetch information is thus indicative of an expected access pattern.

After an elapsed period, since allocation of the given entry, has exceeded a threshold, the prefetch training circuitry is responsive to an eviction condition being met to perform an eviction of the given entry. The eviction comprises transferring the prefetch information associated with the given data address region to the prefetch information storage circuitry. The period may be a time period such that the threshold is an expanse of time. Alternatively, the period may be quantified in a different manner, such as a number of training operations, a number of processor cycles, or a number of data accesses. For example, the period may be deemed to have passed the threshold after training has been performed based on a threshold number of data accesses.

In this manner, the prefetch information storage circuitry is populated with the entries evicted from the prefetch training circuitry. Over time, the prefetch information storage circuitry (which may for example efficiently store the prefetch information in a spatial pattern history table) can thereby build up trained prefetch information associated with different data regions.

The prefetch information is particularly accurate within the present example, because of the above-described threshold time. This threshold has the effect of keeping each entry in the prefetch training circuitry for at least the threshold time, before it is evicted. The inventors have observed that this causes a significantly improved accuracy of the prefetch information. This improvement is observed even whilst some allocations into the prefetch training circuitry may be blocked (because a data access occurs which would otherwise cause allocation of a new entry but the elapsed period has not yet reached the threshold). In part, this effect is mitigated because if the blocked allocation relates to a commonly-accessed data region, it is likely that a future data access will be performed in respect of that region at a time after the threshold period has elapsed, upon which a corresponding entry can be allocated.

In an example, the prefetch circuitry is configured to implement the above-described threshold by maintaining a cooldown counter which, when started, expires after a cooldown period has elapsed. The counter counts in the same manner as described above for the threshold: for example, if the threshold is a number of training operations, the counter counts the number of training operations that are performed. The cooldown period may thus be an integer number of prefetch information training operations. This number may be a prime number, which helps to avoid an undesired pattern in allocated entries (for example repeatedly allocating entries to the same accessed data).

The prefetch circuitry, in this example, also maintains a next eviction identifier to identify a next entry to be evicted. Responsive to the eviction condition being met after the cooldown timer has expired, the prefetch circuitry evicts said next entry to be evicted, starting the cooldown timer, and configuring the next eviction identifier to identify a new next entry to be evicted. In this manner, the entries can be cycled through, each being up for eviction in turn. The above-described threshold can thus be considered as the cooldown period multiplied by the number of entries.

The eviction may be handled in different ways, for example expressed by way of an eviction policy. As an example, the eviction policy may be to identify the next entry to be evicted as the oldest entry. This may be implemented by the next eviction identifier being a round robin pointer, such that the prefetch training circuitry identifies the new next entry to be evicted by incrementing the round robin pointer. The round robin pointer thus progresses through each entry in turn, providing a computationally efficient way of imposing an "oldest entry" eviction policy. In other examples, other eviction policies may be imposed. For example, it may be imposed that each entry is maintained in response to the first attempt to evict it, but evicted following the second attempt.

In this example, the prefetch training circuitry may be configured to block received entry allocation requests whilst the cooldown counter is running. This has the cumulative effect of ensuring that the above-described overall threshold (equal to the cooldown period multiplied by the number of entries) is effectively applied, as following an eviction, the next entry will not be evicted until the cooldown period has passed.

In an alternative example, the prefetch training circuitry is configured to maintain an entry-specific cooldown counter in respect of each said entry. Each cooldown counter is configured to, when started, expire after the threshold has elapsed. The cooldown counter in respect of a given entry is started in response to that entry being allocated. After that cooldown counter has expired, it is determined that the elapsed count since allocation of that entry has exceeded the threshold. This use of entry-specific counters provides an alternative to the above-described use of a single global counter in combination with a round-robin pointer.

This example allows the use of different threshold for different entries. For example, the prefetch circuitry may be configured to dynamically increase said threshold time, in respect of a given entry, in response to a threshold increase determination. The threshold increase determination may be responsive to determining that training of said given entry is expected to improve given said increased threshold time. In this manner, training can be extended for entries which are expected to benefit from additional training, whilst not wasting time on an entry which is not expected to benefit. This expectation of benefit may be based on continuing receiving of access information in respect of a given entry: if continued accesses are performed (and thus useful training information is received), the threshold may be increased. Alternatively, if accesses have ceased in respect of a data addresses corresponding to a given entry, the threshold may not be increased (or may be reduced).

Alternatively or additionally, the threshold increase determination may be applied to randomly selected entries. This allows it to be determined whether such randomly selected entries would benefit from additional training. For example, responsive to the increased threshold leading to an increased quantity of access information in respect of the given entry (for example because further data accesses are performed based on which additional training can be carried out, improving the corresponding expected prediction accuracy), the associated data region may be identified for future application of the increased threshold. Subsequently, responsive to allocating a given new entry to the associated data region, the increased threshold can be applied to the new entry. Thus, over time, the random selection allows application of extra training to entries which would benefit from this, without wasting significant extra training on entries which would not benefit. The size of the random selection can be optimised: a larger size causes more erroneous application of extra training to entries which would not benefit, but also allows quicker identification of the entries which will benefit.

In an example, the eviction condition is met in response to receiving access information in respect of a given data region having no associated entry. The prefetch training circuitry is responsive to evicting said given entry (i.e. after the eviction condition is met after the threshold has been exceeded) to allocate the given entry to the given data region. In this manner, an entry can be allocated.

The above-described apparatus allows for training and storing prefetch data. The apparatus may further comprise prefetch circuitry to receive access information and, based on the access information and on corresponding prefetch information (in the prefetch information storage circuitry), prefetch data into a temporary storage in advance of the anticipated use of said data by processing circuitry. This provides an effective way of performing prefetching based on the above-described trained prefetch information.

Examples of the present disclosure will now be described with reference to the drawings.

FIG. 1 schematically shows an apparatus 100 according to an example of the present disclosure. The apparatus comprises a prefetch training unit 105 and a prefetch information storage unit 110. The units may be implemented as dedicated circuitry, or as functions performed by general purpose circuitry such as a processor.

The prefetch training circuitry comprises a table 115 of entries 115a, such that each entry 115a has a "region" field and a "pattern" field. The table may be stored in dedicated storage such as a series of registers, or in a portion of a more general-purpose storage such as a cache or memory. In an example, the table 115 has 32 entries. A data access is performed, by a processor (not pictured) with which the apparatus 100 is associated. For example, the processor may request access to such data for performing processing operations thereon.

In response to the data access, an entry 115a is allocated in the table 115. The entry identifies a data address region which includes the address of the accessed data. This may for example be a memory address. To this end, the total address space is divided into regions, and the region field of the allocated entry 115a identifies which of these regions includes the accessed data. This may be efficiently performed by masking the bottom bits of the address. For example, if 1k regions are to be provided, the bottom 10 bits may be masked.

The pattern field of the entry 115a records an observed data access pattern associated with the corresponding region. For example, the pattern may be an observed spatial data access pattern recorded by setting bits corresponding to cachelines that have been touched in the corresponding 1 KB region during the lifetime of the entry. Then, those bits may be converted into positive or negative cacheline offsets from the allocating access and stored in the pattern history table.

The recorded pattern is trained over time: as subsequent data is accessed within the region, these accesses are used to train the recorded pattern information to more accurately reflect the pattern of memory access.

In order to make space for the newly-allocated entry 115a, another entry 115b must be evicted. In the present example, this eviction is only permitted if the entry 115b has been in the table for at least a threshold period. The period could be a time period, a number of processing cycles, a number of data accesses, or a number of training operations performed on the entry 115b. If the threshold has not been reached, the allocation of new entry 115a is not performed. As explained above, the application of this threshold significantly improves the accuracy of the pattern determination.

The prefetch information storage 110 comprises a table 120 having multiple entries 120a. As with the table 115 in the prefetch trainer, table 120 may be stored in dedicated storage or in a portion of a general-purpose storage. Each entry 120a includes a region field and a pattern field, and thus corresponds to an entry of the prefetch training table 115. However, there are more (potentially significantly more) entries in the prefetch information storage table 120 than in the prefetch training table 115. For example, the prefetch information storage table 120 may be large enough for each region across the total address space to have its own entry. In other words, if 1k regions are provided, the prefetch information storage table 120 may have 1k entries.

Upon eviction of an entry 115b from the prefetch training table 115, a corresponding entry 120a is stored in the prefetch information storage table 120. The prefetch information storage table 120 thus, over time, accumulates pattern data associated with many address regions. This pattern data can then be used to predict data that will be accessed in the future, which can be prefetched in advance of it being required. For example, data access within a given address region can be observed, and the corresponding pattern information used to extrapolate the data access pattern into the future. This may be performed by dedicated prefetch circuitry as described below with reference to FIG. 2.

Figure 2:
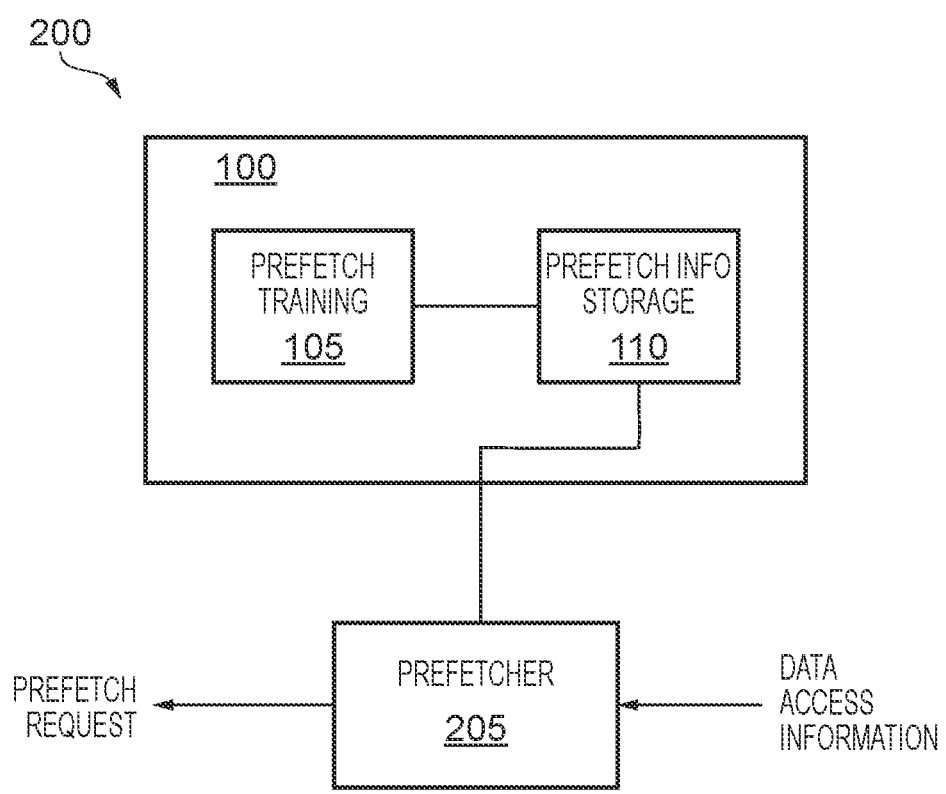
FIG. 2 depicts a system according to an example.

FIG. 2 depicts a system 200 according to an example. The system comprises the apparatus 100 of FIG. 1, and a prefetch unit 205. The prefetch unit receives information indicative of data accesses, for example by a processor (not shown). Based on this information, the prefetch unit 205 accesses the prefetch information storage 110 and uses the stored pattern information to extrapolate the data access into the future and predict data that will be accessed. The prefetch unit 205 then issues a prefetch request based on the predicted data, such that the predicted data can be prefetched (for example into temporary storage such as a cache).

The prefetch training unit 105, prefetch information storage 110 and prefetch unit 205 may be elements of a dedicated prefetcher, i.e. the system 200 may be implemented by a dedicated circuitry element (for example as part of broader processing circuitry). Alternatively, some or all of the elements 105, 110, 205 may be implemented as routines performed by more general-purpose circuitry.

Figure 3:
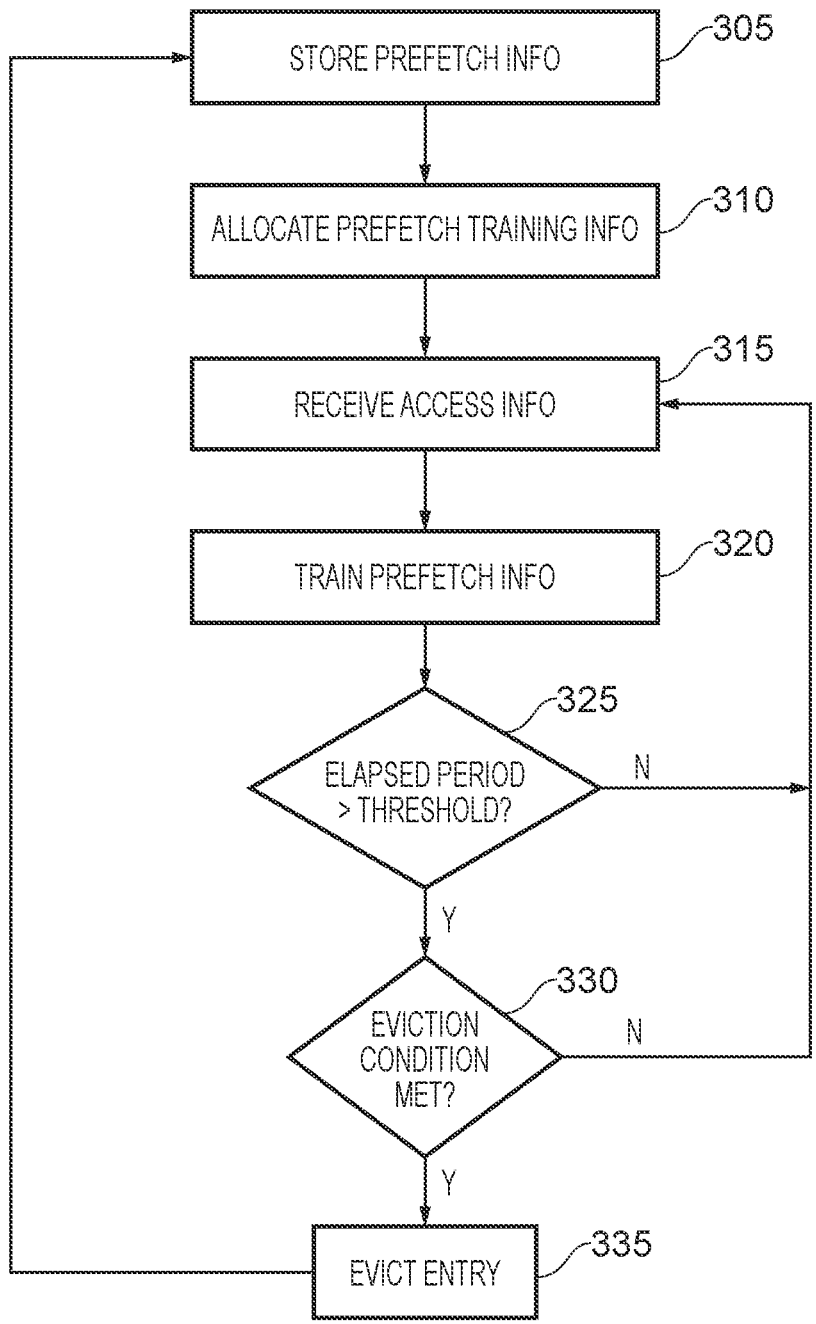
FIG. 3 shows a method according to an example.

FIG. 3 depicts a method according to an example of the present disclosure. The method may for example be performed by the apparatus 100 of FIG. 1.

At block 305, prefetch information associated with address regions is stored in a prefetch information storage.

At block 310, an entry is allocated in a prefetch training unit. The entry corresponds to a particular data region (such as an address range), and tracks prefetch information (for example a data access pattern) associated therewith.

At block 315, data access information associated with the allocated entry is received. For example, this may be a record of data access requests performed by a processor.

At block 320, the prefetch information is trained based on the received data access information.

At block 325, it is determined whether the aforementioned period, since allocation of the entry, has exceeded the aforementioned threshold. If not, flow returns to block 315 where receipt of access information (and training based thereon) is continued. If the threshold has been reached or exceeded, flow proceeds to block 330, where it is determined whether an eviction condition has been met. The eviction condition may for example be that a new data access has been received which corresponds to an address within a region that does not currently have an allocated entry in the prefetch training unit.

If no eviction condition is met, flow returns to block 315. The receipt of access information, and training based thereon, thus continues until the access condition is met.

When the access condition is met, flow proceeds to block 335, where the entry is evicted from the prefetch training unit.

Flow then returns to block 305, where the evicted entry is stored in the prefetch information storage. A new entry is then allocated at block 310, corresponding to the new data access, and the process repeats.

The above method is described as applied to a single entry in the prefetch training unit. However, it can be repeated simultaneously for each entry. Thus, each entry is trained at least until the threshold period has been exceeded, thereby increasing the amount of training that each entry receives. As explained above, this improves prefetch performance and corresponding system performance, even if some data accesses cannot be allocated entries in the prefetch training unit because the threshold has not been exceeded for any of the entries. If such accesses are in a commonly-accessed region, then that region is likely to be accessed again in the future when an entry has passed its threshold, such that it will still get a chance to be trained.

The above-described threshold can be applied in various ways. Two examples will now be described, with reference to FIGS. 4A and 4B.

Figure 4A:
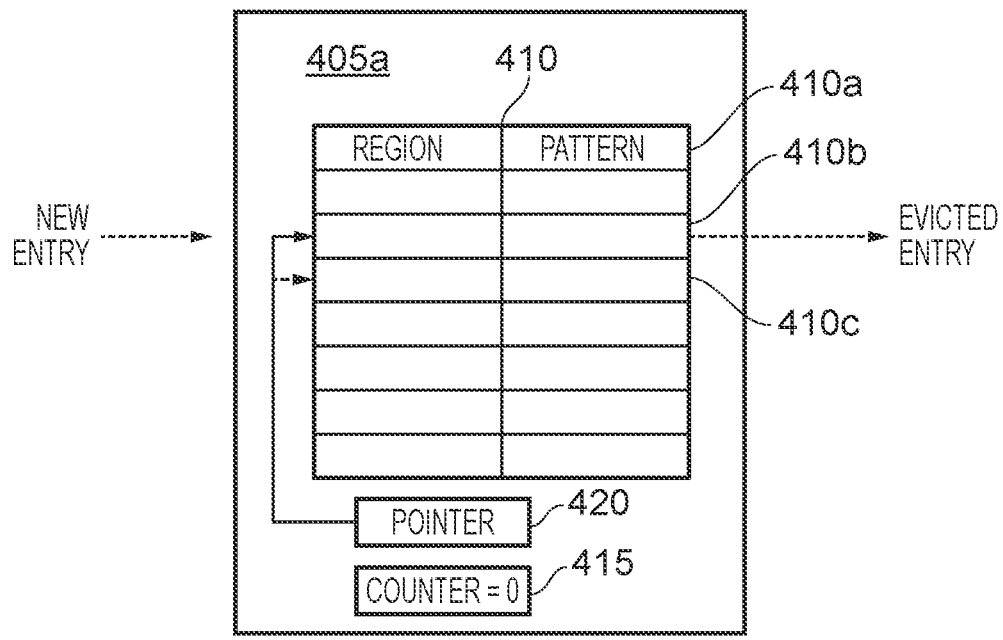
FIGS. 4A and 4B depict example prefetch training units, which may be implemented within the apparatus of FIG. 1.

FIG. 4A shows an example prefetch training unit 405a, which may be implemented in place of the corresponding unit 105 of FIG. 1.

The training unit 405a comprises a prefetch information storage table 410 comprising entries 410a-410c, which corresponds to the similar table 115 of FIG. 1. The training unit also comprises a cooldown counter 415 and a round-robin pointer 420.

The counter 415 is set to a maximum value when an entry is allocated in the table, following which it counts down to zero. In different implementations it can count down as time elapses, or as processor cycles are performed, or as data is accessed, or as training operations are performed. The maximum value may be a prime number, which helps to avoid an inadvertent regular pattern by which the same data accesses are repeatedly allocated entries: a prime number helps to provide a more random sampling of data accesses. The inventors have observed particular effectiveness with a table 410 size of 32 and a maximum cooldown counter 420 value of 17.

The pointer 420 points to the next entry 410b which is to be evicted. In this example, the entry 410b is the oldest entry in the table 410.

When a potential new entry (for example a data access corresponding to an address region which does not currently have an entry in the table 410) is received whilst the counter is non-zero, it is rejected and no eviction is performed.

However, when a potential new entry is received when the counter is zero (as shown in FIG. 4A), the entry 410b identified by the pointer 420 is evicted. The new entry is then allocated to entry 410b, the counter is re-started at the maximum value, and the pointer is incremented. Being a round-robin pointer, incrementing it means that it points to the next entry 410c, identifying that entry as the next entry to be evicted. The pointer thus proceeds through each entry in turn, as evictions are performed. After pointing to the final entry in the table, a further increment causes the pointer 420 to loop back to the first entry 410a. In this manner, each entry is evicted in turn and the pointer 420 always points to the oldest entry in the table.

This use of a global cooldown counter and round-robin pointer provides an efficient way of implementing the above-described threshold: each entry will stay in the table 410 for at least as long as the maximum counter value multiplied by the number of entries, and thus this multiplied value can be considered equivalent to the threshold. Modifications of this example are possible: for example, the counter could start at zero and count up to the maximum value.

Figure 4B:
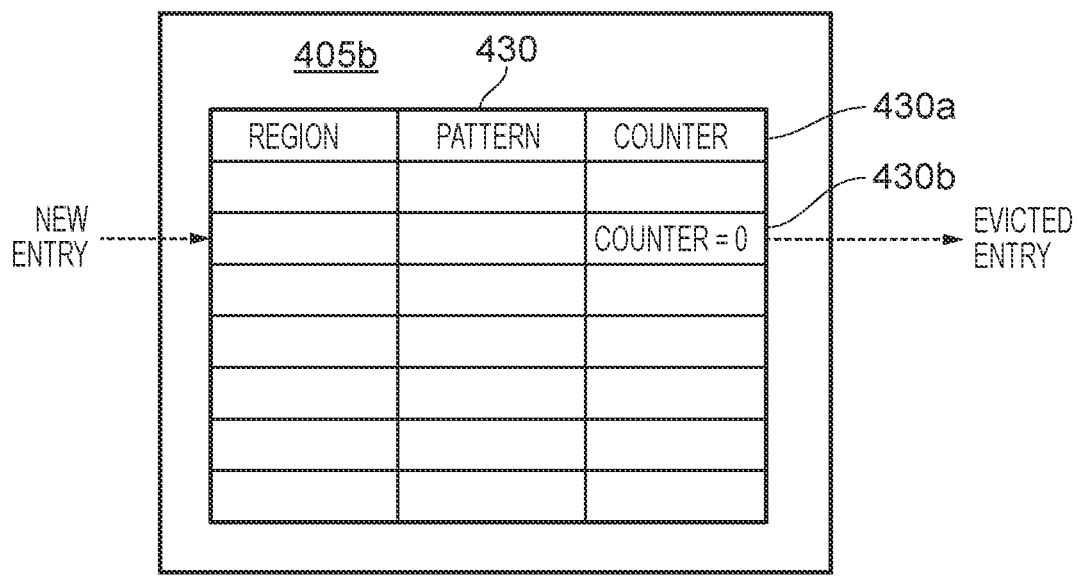

FIG. 4B shows an alternative example prefetch training unit 405b, which may be implemented in place of the corresponding unit 105 of FIG. 1.

The training unit 405a comprises a prefetch information storage table 430 comprising entries 430a, 430b, which somewhat corresponds to the similar table 115 of FIG. 1. However, in addition to the region and pattern fields, each entry also has a counter field. Thus, whereas unit 405a had a single global counter, unit 405b has a dedicated counter for each entry.

When a given entry is allocated, the corresponding counter is set to the threshold value, after which it counts down to zero (or alternatively, it may start at zero and count up to the threshold). As for FIG. 4A, when a potential new entry is received whilst all counters are non-zero, it is rejected and no eviction is performed.

However, if a potential new entry is received when a counter is zero (as shown in FIG. 4B for entry 430b) it can be determined that the threshold has been satisfied in respect of that entry 430b. That entry 430b can thus be evicted, and the new entry allocated thereto. If multiple counters are zero, various methods can be employed to pick an entry to evict. For example, the oldest entry, or a random entry, may be evicted.

The present example may consume more resources than the example of FIG. 4A, because a larger number of counters are provided which must count simultaneously. However, this allows different thresholds to be applied to each entry. An example of this is now described with reference to FIG. 5.

Figure 5:
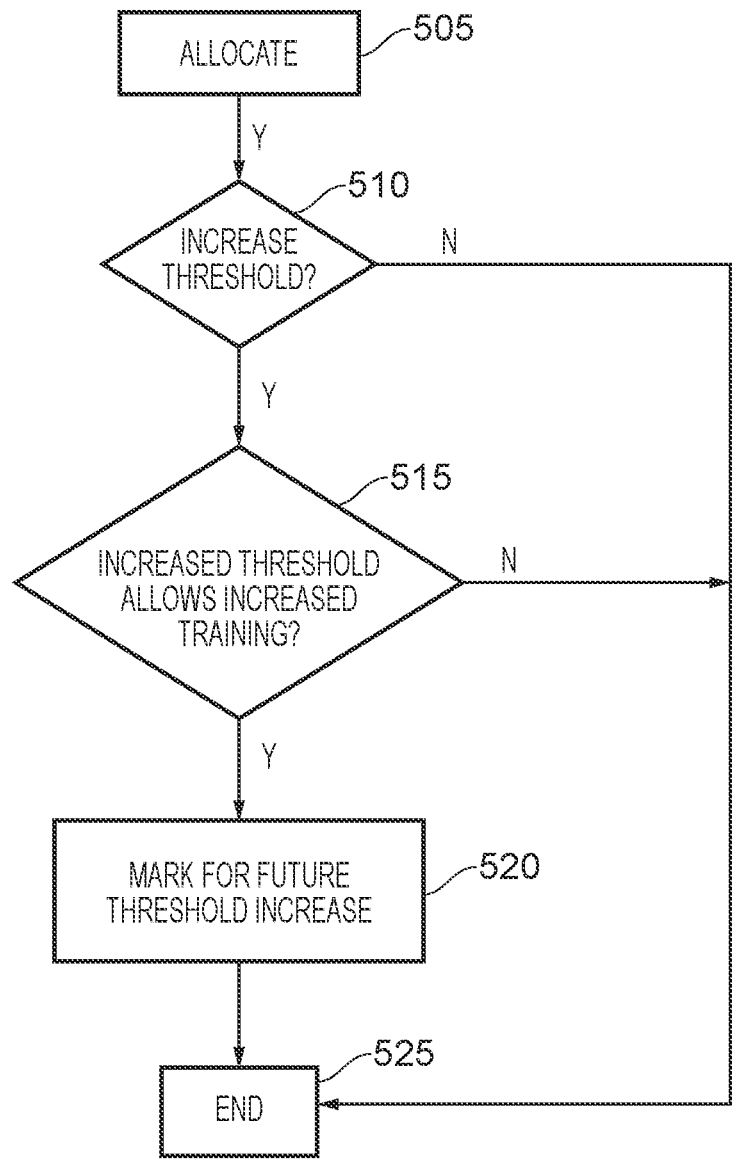
FIG. 5 shows a method according to an example.

FIG. 5 depicts a method which may be performed by the apparatus 100 of FIG. 1.

At block 505, an entry in a prefetch training unit is allocated (for example as described above).

At block 510 it is determined whether to increase the threshold in respect of that entry. For example, a given fraction of entries may randomly have their threshold increased by an additional period.

If the threshold is increased, flow proceeds to block 515 where it is determined whether the increased threshold allows increased training. For example, it may be tracked whether data accesses corresponding to that entry are received during the additional period. If such entries are received, the entry can receive additional training relative to the amount of training that would be performed with the default threshold. The entry thus benefits from the increased threshold. Conversely, if no such data accesses are received during the additional period, it can be concluded that the increased threshold provides no advantage.

If it is determined that the increased threshold allows increased training, the entry is marked for future threshold increases at block 520. For example, this may be stored as a tag associated with the entry.

The method then ends at block 525.

The above-described mark is stored even after the entry is evicted. For example, it may be stored as a tag in the prefetch information storage. Then, when a future entry is allocated corresponding to the same address range, the increased threshold can be applied. This allows additional threshold to be applied to entries which would benefit from it, whilst not blocking up the prefetch training unit with entries that would not benefit from additional threshold.

Apparatuses and methods are thus provided for determining prefetch information.

From the above description it will be seen that the techniques described herein provides a number of significant benefits. In particular, the predictive power of the prefetch information is significantly improved relative to comparative examples which do not implement the present disclosure.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
prefetch information storage circuitry to store prefetch information associated with respective data address regions, the prefetch information in respect of a given data address region identifying expected access patterns associated with the given data address region;
prefetch training circuitry, comprising a plurality of entries, to:
allocate a given entry to a given data address region;
receive access information indicative of data accesses within the given data address region;
based on said access information, train prefetch information associated with the given data address region, the prefetch information being indicative of a pattern of said data accesses within the given data address region; and
responsive to an eviction condition being met after an elapsed period, since said allocation of the given entry, has exceeded a threshold, perform an eviction comprising transferring the prefetch information associated with the given data address region to the prefetch information storage circuitry.

2. An apparatus according to claim 1, wherein:
said expected access patterns are spatial access patterns; and
the pattern of said data accesses is a spatial pattern of said data accesses.

3. An apparatus according to claim 2, wherein the prefetch information storage circuitry stores the prefetch information in a spatial pattern history table.

4. An apparatus according to claim 1, wherein the prefetch training circuitry is configured to:
maintain a cooldown counter which, when started, expires after a cooldown period has elapsed;
maintain a next eviction identifier to identify a next entry to be evicted; and
responsive to the eviction condition being met after the cooldown counter has expired, evicting said next entry to be evicted, starting the cooldown counter, and configuring the next eviction identifier to identify a new next entry to be evicted.

5. An apparatus according to claim 4, wherein the prefetch training circuitry is configured to identify the new next entry to be evicted based on an eviction policy.

6. An apparatus according to claim 4, wherein the prefetch training circuitry is configured to identify the new next entry to be evicted as an oldest entry of said plurality of entries.

7. An apparatus according to claim 6, wherein:
the next eviction identifier is a round robin pointer; and
the prefetch training circuitry is configured to identify the new next entry to be evicted by incrementing the round robin pointer.

8. An apparatus according to claim 4, wherein the prefetch training circuitry is configured to block received entry allocation requests whilst the cooldown counter is running.

9. An apparatus according to claim 4, wherein the cooldown period is an integer number of prefetch information training operations.

10. An apparatus according to claim 9, wherein said integer number is a prime number.

11. An apparatus according to claim 4, wherein said threshold time is equal to the product of the cooldown time period and the number of said plurality of entries.

12. An apparatus according to claim 1, wherein the prefetch training circuitry is configured to:
maintain an entry-specific cooldown counter in respect of each said entry, each cooldown counter being configured to, when started, expire after said threshold has elapsed;
start the cooldown counter, in respect of a given entry, responsive to allocating that given entry; and
responsive to the cooldown counter in respect of a given entry having expired, determine that the threshold has been exceeded in respect of that given entry.

13. An apparatus according to claim 12, wherein the prefetch circuitry is configured to dynamically increase said threshold, in respect of a given entry, in response to a threshold increase determination.

14. An apparatus according to claim 13, wherein the threshold increase determination is responsive to determining that training of said given entry is expected to improve given said increased threshold time; and wherein the threshold increase determination is a random selection of allocated entries.

15. An apparatus according to claim 14, wherein the prefetching circuitry is configured to determine that training of said given entry is expected to improve based on continuing receiving of access information in respect of said given entry.

16. An apparatus according to claim 13, wherein the prefetch training circuitry is configured to: responsive to said increased threshold leading to an increased quantity of access information in respect of the given entry, identify a data address region, to which the given entry is allocated, for future application of the increased threshold; and responsive to subsequently allocating a given new entry to said given data region, apply the increased threshold to said given new entry.

17. An apparatus according to claim 1, wherein: said eviction condition is met in response to receiving access information in respect of a given data region having no associated entry; and the prefetch training circuitry is responsive to evicting said given entry to allocate said given entry to said given data region.

18. An apparatus according to claim 1, comprising prefetch circuitry to: receive said access information; and based on said access information, and on corresponding prefetch information in the prefetch information storage circuitry, prefetch data into a temporary storage in advance of an anticipated use of said data by processing circuitry.

19. A system comprising: the apparatus of claim 1; and processing circuitry configured to access data and, based on said data access, provide said access information to the prefetch training circuitry.

20. A method comprising: storing, in prefetch information storage, prefetch information associated with respective data address regions, the prefetch information in respect of a given data address region identifying expected access patterns associated with the given data address region; allocating a given entry to a given data address region; receiving access information indicative of data accesses within the given data address region; based on said access information, training prefetch information associated with the given data address region, the prefetch information being indicative of a pattern of said data accesses within the given data address region; and responsive to an eviction condition being met after an elapsed period, since said allocation of the given entry, has exceeded a threshold, performing an eviction comprising transferring the prefetch information associated with the given data address region to the prefetch information storage.

* * * * *